United States Patent [19]

Bedford et al.

[11] 4,369,365
[45] Jan. 18, 1983

[54] CORRECTION FOR SCAN PERIOD VARIATION IN OPTICAL IMAGE SCANNERS

[75] Inventors: John Bedford, Midlothian; Graham M. Clarke, Edinburgh, both of Scotland

[73] Assignee: Ferranti Limited, Cheadle, England

[21] Appl. No.: 256,597

[22] Filed: Apr. 22, 1981

[30] Foreign Application Priority Data

May 14, 1980 [GB] United Kingdom ................ 8015935

[51] Int. Cl.³ .............................................. H01J 3/14
[52] U.S. Cl. .................................... 250/236; 358/293
[58] Field of Search ............... 250/201, 234, 235, 236; 358/293

[56] References Cited

U.S. PATENT DOCUMENTS 4,310,757  1/1982  Check et al. ..................... 250/236

Primary Examiner—David C. Nelms
Assistant Examiner—Darwin R. Hostetter
Attorney, Agent, or Firm—Kerkam, Stowell, Kondracki & Clarke

[57] ABSTRACT

Correction for variations in scan period of optical image scanners includes measuring and storing the scan times at which optical events occur to cause image detector signals, detecting an optical marker near the end of the scan and the scan time of its detection, determining the difference between this scan time and a stored scan period, comprising the nominal scan time for marker detection, which difference represents the scan period error, dividing the difference by the stored scan period to provide a scan time unit error and multiplying each stored measured scan time by the unit error to provide a correction for each measured scan time, thereafter adding the correction to the stored measured scan time to give a corrected scan time.

11 Claims, 1 Drawing Figure

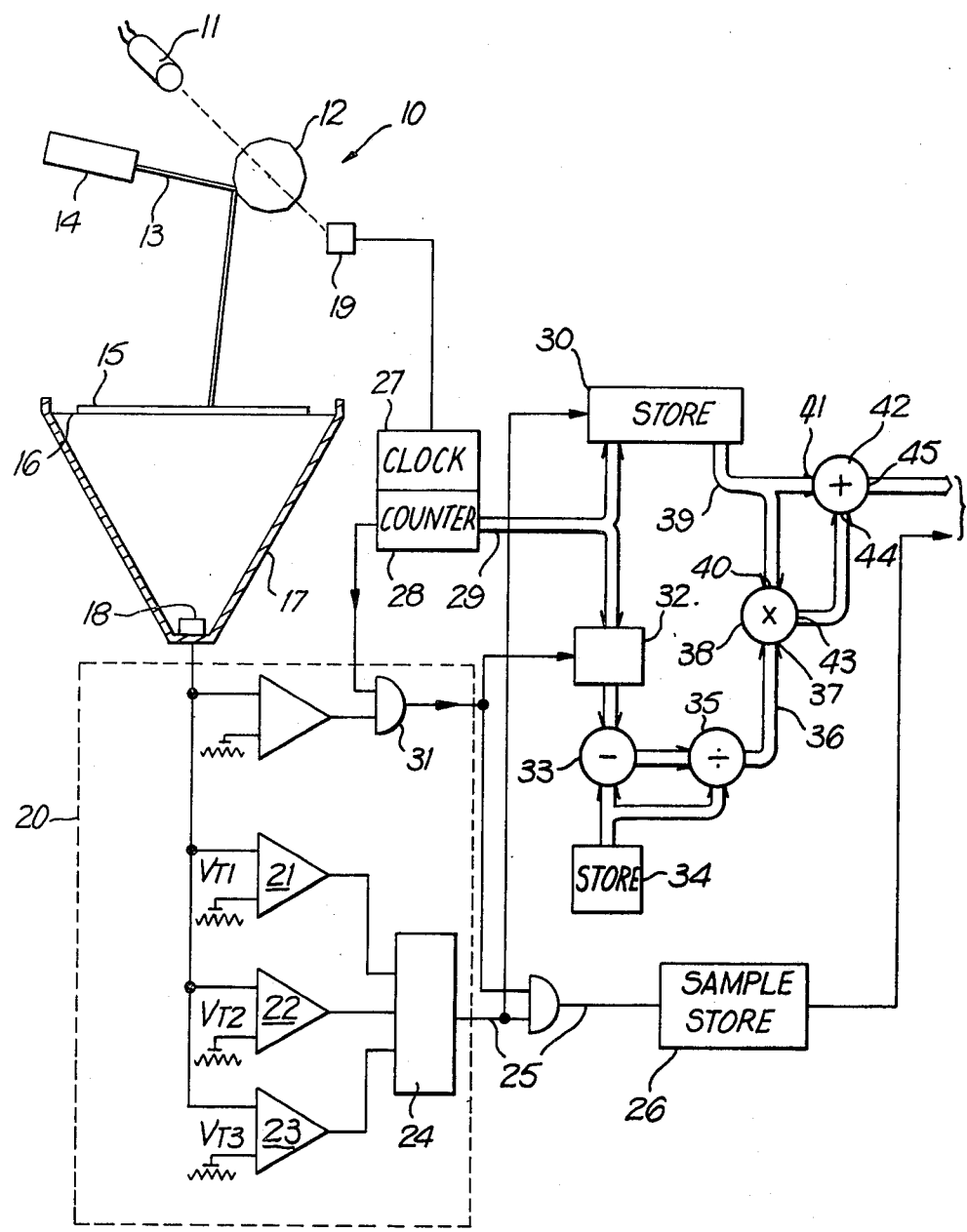

CORRECTION FOR SCAN PERIOD VARIATION IN OPTICAL IMAGE SCANNERS

This invention relates to correction for variations in the scan period of optical image scanners, particularly scanners which employ a mechanical scanning element such as a multi-faceted mirror or prism rotated at high speed.

One form of scanner causes a beam of light to fall onto an object and scan repetitively across its surface to effect a line scan. The object may itself be moving so that different parts of the surface are illuminated in each scan. Light reflected from, or transmitted by, the object is collected by a photodetector which produces an electrical signal in each scan having a magnitude which varies directly with the amount of light collected.

In order to apply quantitive measurements to such scan- derived information the beam is arranged to scan the surface periodically at a substantially uniform speed. In this way the position of the beam at any intermediate point in the scan is a function of the time elapsed since the beginning of the scan. The detector signal is sampled by comparison with one or more threshold voltage levels to detect crossings of the thresholds which, coupled with the scan positions of such crossings identify sample points of the detector signal throughout the scan.

However, in practicable image scanner systems, and particularly in mechanically scanned systems, it is possible for the scan period to drift such that the known scan position is not accurately defined by an absolute scan time measurement based on an expected, or nominal, scan duration.

As such errors are not constant nor predictable they cannot readily be eliminated but they can be corrected for after their occurance and it is an object of the present invention to provide a method of, and apparatus for, mitigating the effects of such errors.

According to one aspect of the present invention a method of correcting for scan period variations in optical image scanners comprises converting optical radiation of the image into an electrical signal throughout the scan, sampling the signal by detecting the crossing of a parameter of the signal of one or more threshold values each indicative of a signal being in a different range of values and timing the crossings to determine scan times therefor, storing sample signals identifying which thresholds are crossed and the scan times measured for the crossings, detecting an optical marker positioned so as to give rise to an electrical marker signal near the end of the scan, storing a time value representative of the nominal scan time at which the marker should be detected, detecting an error in the duration of each scan period by comparing the scan time of actual marker detection with the nominal scan time of detection, and retrieving the stored scan times of the sample signals and adding algebraically to each of the retrieved measured scan times a fraction of the period error in accordance with the value of the measured scan time to give a period corrected measured scan time.

The fraction of the period error may be for each scan time the ratio of the period error to the nominal period (that is, the error per unit scan time interval) multiplied by the measured value of the scan time.

The period times, actual and nominal, and the scan times may be considered in terms of numbers of clock pulses counted from the beginning of each scan.

The sample signals and time signals may be stored digitally for manipulation in binary form.

The detector signal parameter upon which threshold crossing is detected may be the signal magnitude.

According to another aspect of the present invention apparatus for correcting for scan period variations in an optical image scanner comprises photodetection means operable to convert optical radiation of the image into an electrical detector signal throughout the scan, thresholding means operative to receive the detector signal and sample it each time one parameter of the signal crosses a threshold from one range of values to another to provide sample signals, timing means responsive to said sample signals to produce scan time signals indicative of the time from the beginning of the scan at which the sample signals are measured, first storage means operable to store each measured time signal associated with each said sample signal, an optical marker positioned to cause a characteristic detector signal to be produced near the end of each scan, second storage means operable to store a period signal representing a nominal time from the beginning of the scan to detection of the marker and processing means responsive to the detection of the marker to establish the difference between the measured and nominal scan times and give a scan period error signal, to divide the scan period error signal by the stored nominal period signal to provide a scan time unit error signal, and for each of said stored measured scan time signals retrieved from the first storage means to multiply the measured scan time signal by the scan time unit error signal to produce a correction signal for each measured scan time and add each said correction signal to the associated measured time interval to provide a period-corrected scan time.

The timing means may comprise a clock pulse generator and a counter responsive to the start of each scan to count clock pulses and provide an increasing count representative of the instantaneous scan time throughout the scan. The first and second storage means are then preferably digital stores and the time intervals stored are in terms of an appropriate number of said clock pulses.

The processing means may include digital subtraction means operable to subtract a number of pulses representing the actual scan time to detection of the marker from a number of pulses representing the nominal scan time to detection of the marker to give the scan period error signal.

An embodiment of the invention will now be described by way of example with reference to the accompanying drawing, in which the single FIGURE is a schematic representation of an image scanner and the period correction circuitry of the present invention.

Referring to the FIGURE an image scanner 10 comprises a drive motor 11 arranged to rotate at high speed, and a multifaceted prism 12 from which a beam 13 generated by a laser 14 is reflected and caused by the rotation to scan repetitively across an object 15. The object 15 is carried on a transparent table 16 above a light integrating enclosure 17 containing photodetection means 18. Any optical radiation transmitted by the object is collected in the enclosure 17 and directed onto the photodetection means to provide an electrical detector signal which varies in amplitude throughout the scan in accordance with the transmission properties of the object. A scan detector 19 is arranged to give a signal each time the beam commences a new scan. The scan detector may operate from signals derived from the motor supply, from detection of prism position or by a photodetector located to be struck by the beam.

The photodetection means 18 is connected to thresholding means 20. This comprises a plurality, say three, of threshold detectors 21, 22 and 23 each having an input connected to the photodetection means 18 and one input connected to an individual source of threshold voltage $V_{T1}$, $V_{T2}$ and $V_{T3}$ respectively. The threshold detector outputs are connected to inputs of a coding arrangement 24 which has a single output line 25 upon which a sample signal appears digitally as a binary number each time the detector signal crosses one of the threshold voltages to a different range of values. The sample signals are passed to a sample store 26.

Timing means, in the form of a clock pulse generator 27 and counter 28 is triggered by the scan detector 19 to commence a pulse count at the start of each scan and addressed by each sample signal on line 25 to cause the number of pulses counted in the scan, the scan count, to be passed as a parallel binary signal along data path 29 to a scan store 30.

The optical marker is detected by detection of a signal, say from a portion of the table, within a range of scan times for which marker detection can be expected. Marker Gating means 31 is arranged to receive signals from the detection means 18 and from the counter 28. The counter 28 is arranged to produce an output on line 28' after a fixed count has been reached (representing the lowest scan time at which the marker can be detected) and opens gating means 31 so that the next signal detected by detection means 18 is assumed to be due to the marker. The output of gating means 31 is connected to gating means 32 which also receives the value of scan count at which detection of the marker is actually made along data path 29. The detected marker signal may be within any range of sample signals and could cause a sample signal on line 25 to produce a scan count signal at its detection. To avoid this the output of gating means 31 is also supplied to gating means 32' to block a sample signal on line 25 formed as a result of its detection of the marker.

The scan count signal on path 29 produced as a result of detecting the optical marker is passed by gating means 32 to one input of a subtraction circuit 33 of processing means. A digital store 34 contains a binary number which represents a nominal scan count for a complete scan, which number is also applied to the subtraction means 33 in synchronism with the measured scan count. The difference between the numbers represents the scan error and is applied to a division circuit 35 as the dividend. The stored nominal scan count number is also fed to the division circuit 35 as the divisor. The quotient of the division represents the scan time unit error (that is error per scan pulse period) and is applied along data path 36 to one input 37 of a multiplication circuit 38. The scan store 30 is connected by data path 39 to a second input 40 of an addition circuit 42. The output 43 of multiplication circuit 38 is connected to a second input 44 of the addition circuit, which has an output terminal 45.

In operation, during each scan the sample signals are stored in sample store 26 and the scan count of the sample signals are stored in scan store 30. At the end of the scan the total error between actual and nominal scan periods is determined by reference to detection of the optical marker and the scan time unit error calculated. Then each scan count is retrieved from the store in turn and multiplied by the scan time unit error to give the amount by which the scan count is in error. Finally the error is added to the measured scan count to give a period corrected scan count at terminal 45. Each sample signal is read from the sample store in synchronism with the scan count from the scan store and the sample signal is coupled with the period corrected scan count signal to identify the sample signals.

If the signals are to be further stored the sample store 26 may be omitted and the sample signals stored as they are produced with the scan times being stored after the scan when period correction has been made.

The procedure described above for detecting and identifying the optical marker is simple and effective if other signals are not likely to be detected very close to the optical marker. An alternative method (not shown) is to arrange the optical marker as a coded sequence of regions, such as strips, having differing optical characteristics such that the detector signal has a corresponding sequence which can be identified electrically to indicate detection of the optical marker.

The part of the scanner described prior to the photodetection means is exemplory only and is of known form. Other forms providing detector signals may be chosen as appropriate to the optical properties giving rise to the signal. The correction apparatus may be applied equally to other arrangements of scanner.

For instance the photodetector may be arranged to receive scattered light, diffusely or specularly reflected from the object. Furthermore instead of a beam of light scanning the surface the whole object may be illuminated and the field of view of the photodetection means scanned. The correction apparatus and the method of correction described above are equally suited to other forms of image scanners, whether mechanical or not, in which the signal is to be sampled at discrete values and non-constant scan periods occur.

The elements of the processing means are all conventional digital circuits and are shown and described only by their function.

What we claim is:

1. A method of correcting for scan period variations in optical image scanners comprising converting optical radiation of the image into an electrical signal throughout the scan, sampling the signal by detecting the crossing by a parameter of the signal of one or more threshold values each indicative of a signal being in a different range of values and timing the crossings to determine scan times therefor, storing sample signals identifying which thresholds are crossed and the scan times measured for the crossings, detecting an optical marker positioned so as to give rise to an electrical marker signal near the end of the scan, storing a time value representative of the nominal scan time at which the marker should be detected, detecting an error in the duration of each scan period by comparing the scan time of actual marker detection with the nominal scan time of detection, and retrieving the stored scan times of the sample signals and adding algebraically to each of the retrieved measured scan times a fraction of the period error in accordance with the value of the measured scan time to give a period corrected measured scan time.

2. A method as claimed in claim 1 in which the fraction of the period error is for each scan time the ratio of the period error to the nominal period multiplied by the measured value of the scan time.

3. A method as claimed in claim 1 or claim 2 in which the period times and scan times are measured as numbers of clock pulses counted from the beginning of each scan.

4. A method as claimed in claim 3 in which the sample signals and time signals are stored digitally.

5. A method as claimed in any one of claims 1 and 2 in which the detector signal parameter upon which threshold crossing is detected is the signal magnitude.

6. Apparatus for correcting for scan period variations in an optical image scanner comprising photodetection means operable to convert optical radiation of the image into an electrical detector signal throughout the scan, thresholding means operative to receive the detector signal and sample it each time one parameter of the signal crosses a threshold from one range of values to another to provide sample signals, timing means responsive to said sample signals to produce scan time signals indicative of the time from the beginning of the scan at which the sample signals are measured, first storage means operable to store each measured time signal associated with each said sample signal, an optical marker positioned to cause a characteristic detector signal to be produced near the end of each scan, second storage means operable to store a period signal representing a nominal time from the beginning of the scan to detection of the marker and processing means responsive to the detection of the marker to establish the difference between the measured and nominal scan times and give a scan period error signal, to divide the scan period error signal by the stored nominal period signal to provide a scan time unit error signal, and for each of said stored measured scan time signals retrieved from the first storage means to multiply the measured time signal by the scan time unit error signal to produce a correction signal for each measured scan time and add each said correction signal to the associated measured time interval to provide a period-corrected scan time.

7. Apparatus as claimed in claim 6 in which the timing means comprises a clock pulse generator and a counter responsive to the start of each scan to count clock pulses and provide an increasing count representative of the instantaneous scan time throughout the scan.

8. Apparatus as claimed in claim 7 in which the first and second storage means are digital stores and the respective time signals are stored therein as an appropriate number of clock pulses.

9. Apparatus as claimed in claim 8 in which the processing means includes digital subtraction means operable to subtract a pulse count representing the actual scan time to detection of the marker from a pulse count representing the nominal scan time to detection of the marker to give the scan period error signal.

10. Apparatus as claimed in any one of claims 6 to 9 in which the detector signal, characteristic of the optical marker, is produced by opening gating means at a predetermined scan time immediately prior to that at which detection of the marker is expected and passing the next detector signal, assumed to be due to the optical marker.

11. Apparatus as claimed in any one of claims 6 to 9 in which the optical marker consists of a plurality of regions of different optical properties arranged to be scanned in a sequence to produce a characteristically coded detector signal and including decoding means operable to identify the sequence and produce the characteristic detector signal.

* * * * *